US010552847B2

(12) United States Patent
Calzaretta et al.

(10) Patent No.: US 10,552,847 B2
(45) Date of Patent: *Feb. 4, 2020

(54) REAL-TIME PATTERN MATCHING OF DATABASE TRANSACTIONS AND UNSTRUCTURED TEXT (71) Applicant: International Business Machines Corporation, Armonk, NY (US)

(72) Inventors: Henry E. Calzaretta, Lisle, IL (US); Shantan Kethireddy, Chicago, IL (US); Brian R. Muras, Otsego, MN (US); Timothy P. Winkler, Clinton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/467,081

(22) Filed: Mar. 23, 2017

(65) Prior Publication Data
US 2018/0276683 A1 Sep. 27, 2018

(51) Int. Cl.
*G06F 16/00* (2019.01)
*G06Q 30/00* (2012.01)
(Continued)

(52) U.S. Cl.
CPC ......... *G06Q 30/0185* (2013.01); *G06F 7/026* (2013.01); *G06F 16/243* (2019.01);
(Continued)

(58) Field of Classification Search
CPC . G06Q 30/0185; G06F 7/026; G06F 17/2705; G06F 17/2735; G06F 17/278;
(Continued)

(56) References Cited

U.S. PATENT DOCUMENTS 7,328,211 B2 * 2/2008 Bordner ................ G06F 17/277
7,630,986 B1 12/2009 Herz et al.
(Continued)

FOREIGN PATENT DOCUMENTS

EP 1033663 A2 9/2000
WO 2008113065 A1 9/2008
WO 2013185070 A1 12/2013

OTHER PUBLICATIONS

Tan et al., Introduction to Data Mining 2006, 169 pages (Year: 2006).*
(Continued)

*Primary Examiner* — Noosha Arjomandi
(74) *Attorney, Agent, or Firm* — Cantor Colburn LLP; Will Stock (57) ABSTRACT

Aspects include obtaining a pattern that describes an event in a natural language format. The pattern that describes the event is converted into at least one identified pattern key value pair. A database transaction is monitored and converted into a least one database transaction key value pair. A similarity score is calculated by scoring similarities between the identified pattern key value pair(s) and the database transaction key value pair(s). Based on similarity score meeting a threshold, an alert is output to indicate that the database transaction matches the pattern that describes the event.

13 Claims, 5 Drawing Sheets (51) Int. Cl.
*G06F 7/02* (2006.01)
*G06F 16/242* (2019.01)
*G06F 16/25* (2019.01)
*G06F 16/2457* (2019.01)
*G06F 17/27* (2006.01)

(52) U.S. Cl.
CPC ...... *G06F 16/24575* (2019.01); *G06F 16/254* (2019.01); *G06F 17/2705* (2013.01); *G06F 17/278* (2013.01); *G06F 17/2735* (2013.01)

(58) Field of Classification Search
CPC ......... G06F 17/30401; G06F 17/30528; G06F 17/30563; G06F 16/243; G06F 16/24575; G06F 16/254; G06F 7/02; G06F 2207/025; G06F 16/24578
See application file for complete search history.

(56) References Cited

U.S. PATENT DOCUMENTS

| | | | |
|---|---|---|---|
| 7,656,288 B2 * | 2/2010 | Joslin | G01D 9/005 340/521 |
| 2008/0154848 A1 * | 6/2008 | Haslam | G06F 17/30011 |
| 2009/0077383 A1 * | 3/2009 | de Monseignat | H04L 63/0823 713/175 |
| 2009/0190839 A1 * | 7/2009 | Higgins | G06F 16/3347 382/209 |
| 2013/0117294 A1 * | 5/2013 | Arao | G06F 16/245 707/758 |
| 2013/0151235 A1 | 6/2013 | Och et al. | |
| 2014/0006401 A1 * | 1/2014 | Levandoski | G06F 3/0604 707/737 |
| 2014/0201126 A1 | 7/2014 | Zadeh et al. | |
| 2016/0092528 A1 | 3/2016 | Bobick et al. | |
| 2017/0193542 A1 * | 7/2017 | Rapaka | G06F 16/24578 |
| 2018/0150494 A1 * | 5/2018 | Schulze | G06F 16/2228 |

OTHER PUBLICATIONS

Mohan et al., Anomaly detection in banking operations, 2017, 33 pages. (Year: 2017).*
List of IBM Patents or Patent Applictions Treated as Related; (Appendix P), Filed Jun. 15, 2017, 2 pages.
Henry E. Calzaretta, et al., Pending U.S. Appl. No. 15/623,940 entitled "Real-Time Pattern Matching of Database Transactions and Unstructured Text," filed Jun. 15, 2017.
Ahmad, Tanvir, et al; "Opinion Mining Using Frequent Pattern Growth Method from Unstructured Text." Computational and Business Intelligence (ISCBI), 2013.IEEE, 2013, 4 Pages.

* cited by examiner

REAL-TIME PATTERN MATCHING OF DATABASE TRANSACTIONS AND UNSTRUCTURED TEXT

BACKGROUND

This disclosure relates generally to computer systems, and more specifically, to real-time pattern matching of database transactions and unstructured text.

SUMMARY

According to embodiments, a system and a computer program product are provided. A system includes a memory and a processor for executing computer readable instructions for obtaining a pattern that describes an event in a natural language format. The pattern that describes the event is converted into at least one identified pattern key value pair. A database transaction is monitored and converted into a least one database transaction key value pair. A similarity score is calculated by scoring similarities between the identified pattern key value pair(s) and the database transaction key value pair(s). Based on the similarity score meeting a threshold, an alert is output to indicate that the database transaction matches the pattern that describes the event.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Pattern matching between database transactions and unstructured text is provided by one or more embodiments described herein. In accordance with one or more embodiments, a pattern describing an event is input by a user in a natural language format, and natural language processing (NLP) is used to convert the pattern into a key value pair (e.g., XML) description. At least one database (DB) transaction is monitored and an intermediate description of the DB transaction that describes the transaction is automatically generated in a natural language. In accordance with one or more embodiments, NLP is used to convert the intermediate description of the DB transaction to a second description with key value pairs. The key value pairs that describe the pattern are compared with the key value pairs that describe the transaction. An alert is generated if it is determined that they describe a similar event. In accordance with one or more embodiments, they describe a similar event if a similarity score meets a threshold value. In addition or instead of the alert, the system can perform other actions such as, but not limited to: stopping the database transaction, notifying an administrator, updating a score that measures similarity over time, and/or logging the event. One or more embodiments, as described in the example below can be utilized to detect fraudulent activity in a retail environment.

A question/answering system, such as IBM Watson®, can be used to process the natural language of both the user pattern description of the event and the intermediate description of the DB transaction in order to calculate a similarity score.

In accordance with one or more embodiments, transactional relational data is supplemented with labels and user supplied data descriptors (e.g., case statements of values and labels). This supplemental DB data is used to match the transaction to a user supplied description of the event. In this manner, the relational database management system (RDBMS) text description is broadened so that the structure can be automatically correlated to other existing static information (e.g., customer information, product information) that has been prepared. Labels on the DB columns can provide a description of column data in human readable format. For example, STR_DT may stand for "Start Date of Customer Membership." The case statement can be used to describe value definitions when ambiguous. For example, a value of "R" in the Return Flag column can indicate "Product Returned."

Rows currently stored in a DB table, rows at rest, that are in the same format can be combined and/or rows from two or more tables can be combined based on referential integrity (RI) such as a row in a fact table and a row in a dimension table. When many rows in many tables have been prepared, RI can be used or rows can be aggregated with synonyms (e.g. aggregate records each representing a purchase of XYZ drug by a customer). Users can also enter rules, for example a user can create a rule that states that that when an aggregation of particular rows occurs, count the number of start_dates in 2016 and provide this information with a label "number of purchases in 2016." In this way, users can provide some aggregation rules that can be used in generating the human readable text.

A tool such as, but not limited to, JavaScript Object Notation (JSON) can be used to automatically convert user entered text that is in an unstructured natural language format into a structured, human readable format such as XML key-value pairs.

Figure 1:
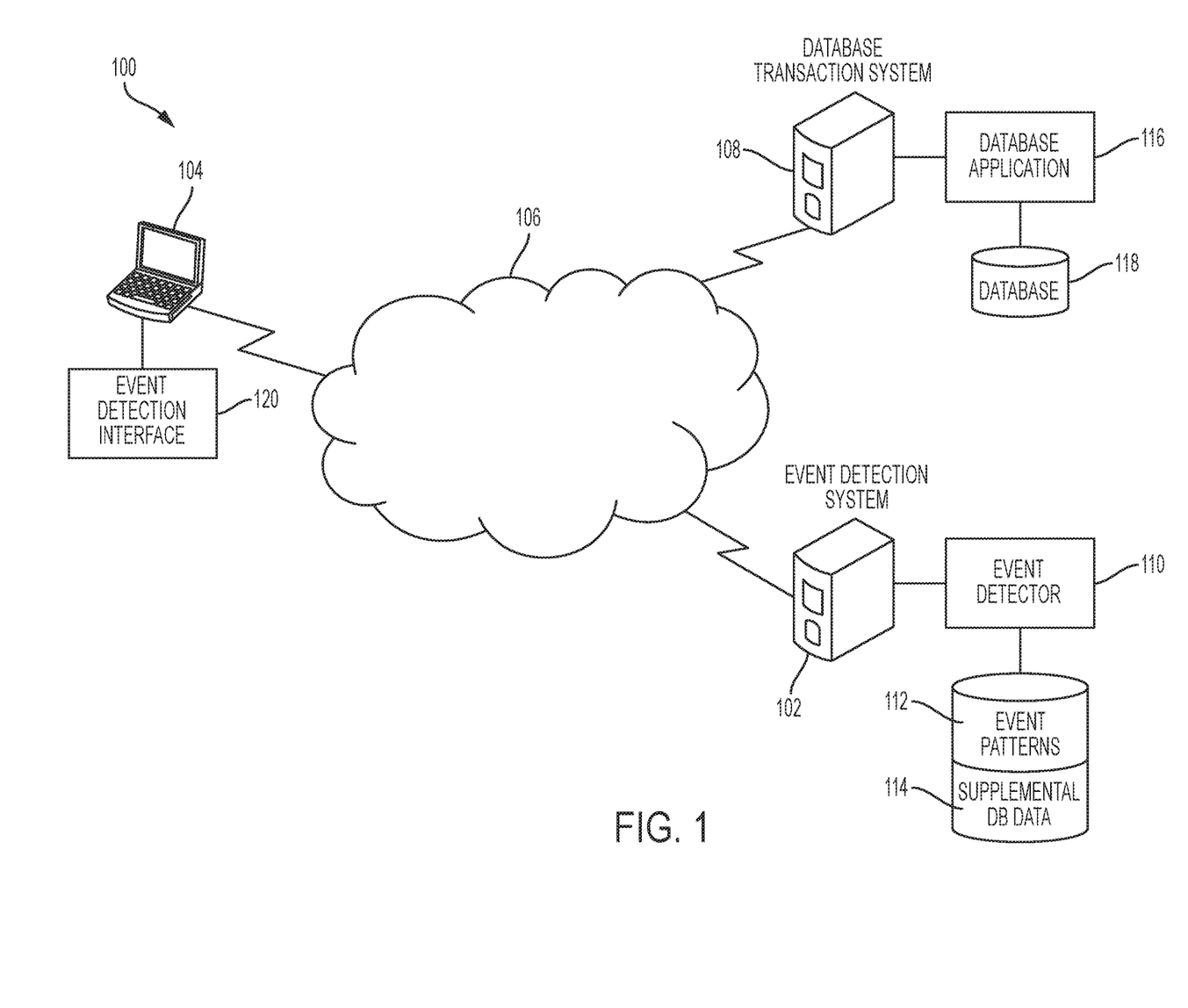
FIG. 1 depicts a system for real-time pattern matching of database transactions and unstructured text in accordance with one or more embodiments.

Turning now to FIG. 1, an example of a system 100 upon which real-time pattern matching of database transactions and unstructured text may be implemented will now be described in greater detail. The system 100 represents a networked environment, such as the Internet, where users can enter event descriptions and received alerts in an interactive and real-time manner.

In the example depicted in FIG. 1, the system 100 includes at least one event detection system 102 to interface with a user system 104 and a DB transaction system 108 over a network 106. In the embodiment shown in FIG. 1, an event detector 110 executes on the event detection system 102 to receive patterns of interest input by a user via the event detection interface 120 on a user system 104. The event detector 110 also monitors one or more transactions being executed by the DB application 116 on the DB transaction system 108. The event detector 110 can further facilitate the creation of supplemental DB data 114 describing the monitored DB transaction. In one or more embodiments, the supplemental DB data 114 is input by a user via the user system 104.

In one or more embodiments, all or a portion of the DB transaction system 108, including the DB application 116, is executing on the user system 104 and/or all or a portion of the DB 118 is located on the user system 104. In addition, all or a portion of the event detection system 102 including the event detector 110 can be executing on the user system 104 and/or all or a portion of the event patterns data 112 and supplemental DB data 114 can be located on the user system 104.

Although only one user system 104, one DB transaction system 108 and one event detection system 102 are depicted in FIG. 1, it will be understood that there can be one or more of each of these components which can interface with each other across the network 106 over a geographically wide area. The network 106 may be any type of communications network known in the art and can include a combination of wireless, wired, and/or fiber optic links.

In one or more exemplary embodiments, the event detection system 102 and the DB transaction system 108 are each implemented on a high-speed processing device (e.g., a mainframe computer system, a cloud computing system, or the like) including at least one processing circuit (e.g., a computer processor/CPU) capable of reading and executing instructions, and handling interactions with various components of the system 100. Alternatively, the event detection system 102 and/or the DB transaction system 108 can be embodied entirely in hardware including circuits and memory to perform processes as described herein.

In one or more exemplary embodiments, the user system 104 can include a variety of computing devices with processing circuits and I/O interfaces, such as keys/buttons, a touchscreen, audio input, a display device and audio output. The user system 104 can be embodied in any type of computing device known in the art, such as a laptop, tablet computer, mobile device, personal computer, workstation, server, and the like. Accordingly, the user system 104 can include various computer/communication hardware and software technology known in the art, such as one or more processing units or circuits, volatile and non-volatile memory including removable media, power supplies, network interfaces, support circuitry, operating systems, and the like.

Figure 2:
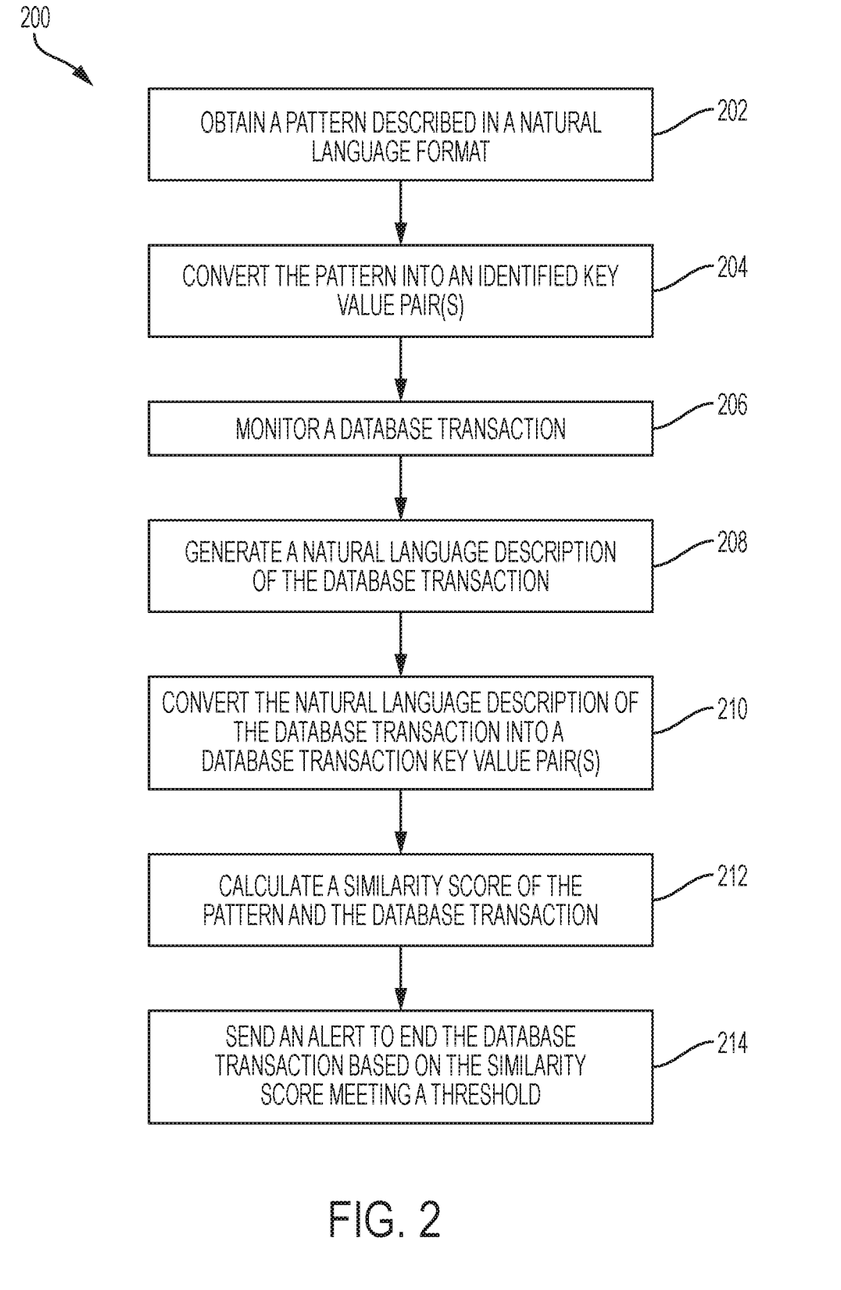
FIG. 2 depicts a flow diagram of real-time pattern matching of database transactions and unstructured text in accordance with one or more embodiments.

Turning now to FIG. 2, a flow diagram 200 of real-time pattern matching of DB transactions and unstructured text is generally shown in accordance with one or more embodiments. The processing shown in FIG. 2 can be performed using all or a portion of the components shown in the system 100 of FIG. 1. At block 202, a pattern described in a natural language format (e.g., unstructured text) and associated with an event is obtained, for example, from a user at a user system 104 executing the event detection interface 120. At block 204, the pattern is converted into an identified key value pair by for example, the event detector 110, and stored as event patterns data 112. The conversion from the natural language format into the human readable machine parseable format of key value pairs can be performed by tools such as, but not limited to IBM Watson and Apache® OpenNLP.

Prior to the monitoring at block 206, column headers in human readable text format and case statement logic for the various values as well as well as any aggregate rules and RI rules to enforce or skip have been specified, for example by a user or database administrator (DBA).

At block 206, one or more DB transactions are monitored. Referring back to FIG. 1, this can include the event detection system 102 monitoring DB transactions generated by the DB transaction system 108. In accordance with one or more embodiments, the event detector 110 monitors incoming transactions such as, but limited to updates to tables in the DB 118, and generates a natural language description of the DB transactions at block 208. In accordance with one or more embodiments, block 208 is performed using supplemental DB data 114. In accordance with one or more embodiments, column labels are used to help build human readable information, as well as user supplied human readable descriptions of coded values contained in the DB. The natural language descriptions, generated at block 208, are converted at block 210 into human readable, machine parseable formats.

In accordance with one or more embodiments, the input of the pattern at block 202 is unstructured but guided in some way (e.g. a form), and the form (and resulting taxonomy) can help identify attributes needed to match to a DB transaction. The user labels of the DB columns and case statements related to the DB transaction can be converted to the taxonomy. The designer(s) of the forms used in block 202 to ingest the data can work with DBAs to provide label details in order to better correlate the identified key value pairs generated at block 204 with the DB transaction. In accordance with one or more embodiments, the input of the pattern at block 202 is completely unstructured data. In this case, in one or more embodiments, the system has domain specific taxonomies and attempts to convert the entered text into the domain specific taxonomy. In accordance with one or more embodiments, the pattern data obtained in block 202 is normalized with the labels in the DB columns and case statements. If the user has already entered labels for all of the DB columns, the tool can ask for more information from the person entering the pattern data obtained at block 202 in order to further identify information Referring to FIG. 2, at block 212, a similarity score of the patterns obtained at block 202 and the DB transaction key value pair(s) is calculated. The fully inflated DB transaction may have a large amount of information and in accordance with one or more embodiments, a user supplied tolerance for matching is utilized (e.g., a threshold having a default value of 75% or some other value). Users can also add a weight to various attributes such that certain attributes (like the rebate and coupon attributes) are more important than the price because presumably, the same fraud that occurs with a particular product (e.g., a blood glucose monitor) can happen with any of the products that have a rebate and an in store coupon. User supplied biasing to various attributes can aid in identifying these additional events.

At block 214, an alert is generated if the similarity score meets a predefined threshold. In accordance with one or more embodiments, an action such as, but not limited to: ending the DB transaction, notifying an administrator, and/or logging information about the alert is also performed at block 214.

In addition to the real-time analysis described herein, the processing of FIG. 2 can also be performed in a batch mode on contents of an existing database.

In accordance with one or more embodiments, human readable text aliases for DB column names and column data that are used in block 208 to create natural language descriptions of DB transaction are aggregated with other correlated data that has already been converted and stored as supplemental DB data. This aggregated data can be used more broadly define the DB transactions using, for example, synonyms and aggregate terms. In addition, publicly available information can also be utilized.

The following text describes an example implementation that is directed to fraud detection in a retail environment in accordance with one or more embodiments. In accordance with one or more embodiments, a fraud pattern is identified and it gets matched to DB transaction events which represent observed events. An observed event doesn't need to be aggregated with others over time for validation, and each reported instance is generally valid (e.g., you don't need a machine learning algorithm to first determine the cause and effect relationships and the attributes of interest). The examples relating to fraud detection in a retail environment are provided for purposes of explanation, as embodiments are not limited to fraud detection in a retail environment. Other example implementations include but are not limited to: fraud detection in Workers' Compensation, financial fraud, and customer satisfaction issues.

One of the hallmarks of an effective fraud is that it is repeated by many people of many different backgrounds in many different places. Typically, an effective fraud will repeat itself for many years before it becomes well known. Once the fraud has been identified, it can be a laborious process to institute interventions within business processes or to make people aware of the fraudulent activities.

An example of a fraud in a retail environment described herein is related to a product, such as a blood glucose monitoring product, that is stocked on the shelves of a retail pharmacy store with a rebate. The retail price of the product can be $70 which does not take into account a $35 store discount at the register and a $35 manufacturer coupon. A person could purchase the product, effectively for free, and then return several days later to return the product at full price if the rebates received by the customer were not taken into account in the return process. In a large retailer with multiple locations, this activity can occur hundreds of times. Even if an employee of the retailer observes and reports the incident, it can take months to effectively describe the fraud and deploy an alert/intervention programmatically within an existing point-of-sale (POS) business processes.

Another example of fraud in a retail environment involves the theft of laundry detergent pod buckets which thieves then sell individually at laundromats. This situation was reported on by a national news program more than one year after it was noticed, however the scam was documented earlier on-line in social media sites and on certain shopping websites. With earlier information, retailers might have been able to prevent theft by, for example, more closely monitoring the product and/or by restricting access to the laundry detergent pod buckets. A tool, implemented by one or more of the embodiments described herein, that understands and is able to describe the attributes of (in this case) retailer transactions (shopping, products it sells, pharmacy, services it provides) and correlate that information with publicly and privately available fraud information that has been analyzed and described in a similar format can be used to help lessen the amount of fraudulent activity.

Currently, when an employee of a retail store observes a fraud it is relayed to management who may get information technology personnel involved to create business rules based on attributes of the fraud, the perpetrators, the action, and the products. These rules can include web/application logic along with DB logic and/or transactional stream logic. When another case of that exact fraud is encountered, then it will get flagged by the system. When a permutation of that fraud is encountered, it may or may not get flagged, and new rules may need to be defined to flag the permutation. When a different fraud is encountered, new rules must be reactively defined.

Contemporary fraud reporting and rectification mechanisms require a great deal of manual intervention. In order to institute transactional fraud detection, applications often need to be modified to handle each new case, which may include new web application within transactional process to check credit fraud. In addition, fraud data in the public domain is not currently mined, classified, analyzed for relevance, and/or embedded in existing processes.

As described herein, one or more embodiments include a language that can classify an identified fraud (e.g., based on user input and/or based on mining public information), a technology that can describe a current incoming transaction in the same language, and the ability to perform fraud pattern recognition by correlation of identified fraud descriptions to new (fraudulent) transactional process descriptions.

In accordance with one or more embodiments, a facility is provided to allow users, such as employees of a pharmacy, who experience a fraud to enter the information as unstructured text into a system for processing at point of detection, which in this example is at a POS device. As described herein, these fraud descriptions can be converted into a human readable, machine parse-able format such as, but not limited to JSON. For the retailer in this example, a rudimentary taxonomy can include: Store, Store Type, StoreActor(s), CustomerActor(s), Store Actor's Action(s), Customer's Action(s), Product, Product Type, Fraud Descriptor, and Resolution. Entity detection can be bolstered by the use of industry specific dictionaries. In addition, the attributes can be geared towards fraud analysis. For example, an attribute for Fraud Description can contain further investigative information/questions that can help guide a POS staff member when a potential fraud is detected.

In accordance with one or more embodiments, incoming transactions such as updates to customer table, product table, and sales table are monitored and converted into a human readable, machine parse-able format. In accordance with one or more embodiments, supplemental DB data is added to the table(s) and converted into human readable format. Column labels can help to build human readable information, as well as user defined human readable values for coded column data.

In addition, supplemental DB data can be aggregated with other correlated data that has already been converted and stored as supplemental DB data. Aggregating data can help to more broadly define the transaction using synonyms and aggregate terms. Using customer table information and product table information as examples, by correlating a transaction description that contains a product identifier to a fuller description of that product identifier, the matching algorithm can do a better job in identifying frauds.

In addition, transactional matching of POS database management system (DBMS) transactions to fraud entries in the fraud reference center, stored for example, as fraud patterns, can be performed. Based on a certain percentage match (e.g., the similarity score meets a threshold) the return of a product may get flagged for further determination by the POS agent. One or more embodiments can also be utilized to analyze a retailer's risk of being harmed by fraudulent activity based on a proposed rebate or sales campaign. Further embodiments can mine and classify internal or publicly available unstructured and structured fraud information to determine its relevance to a customer's environment.

Figure 3:
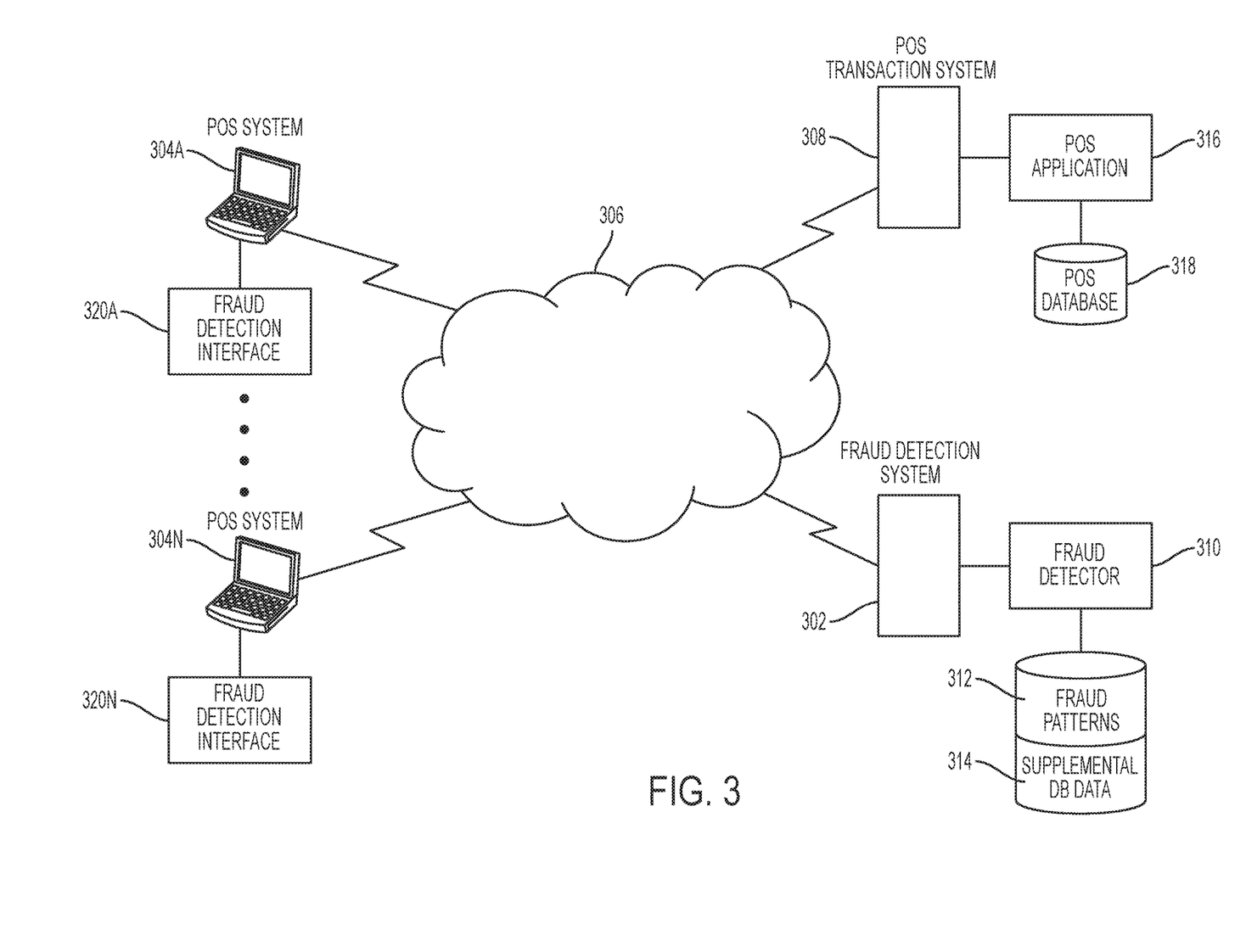
FIG. 3 depicts a system for real-time pattern matching of point-of-sale (POS) terminal transactions and unstructured text in accordance with one or more embodiments.

Turning now to FIG. 3, an example of a system 300 upon which real-time pattern matching of POS terminal transaction transactions and unstructured text to detect fraudulent activity in a retail environment may be implemented will now be described in greater detail. The system 300 represents a networked environment, such as the Internet, where users can enter event descriptions and received alerts in an interactive and real-time manner.

In the example depicted in FIG. 3, the system 300 includes at least one fraud detection system 302 to interface with POS systems 304A-N and a POS transaction system 308 over a network 306. In the embodiment shown in FIG. 3, a fraud detector 310 executes on the fraud detection system 302 to receive fraud patterns of interest that were entered by a user(s) via a fraud detection interface 320A-N executing on one of the POS systems 304A-N. In one or more embodiments, fraud patterns can also be entered via a user system (may not be POS) that is communicatively coupled to the fraud detection system 302. The fraud detector 310 also monitors one or more transactions being executed by the POS application 316 on the POS transaction system 308. The fraud detector 310 can further facilitate the creation of supplemental DB data 314 describing the monitored POS transaction(s).

In one or more embodiments, all or a portion of the POS transaction system 308, including the POS application 316, is executing on the POS systems 304A-N and/or all or a portion of the POS DB 318 is located on the POS systems 304A-N. In addition, all or a portion of the fraud detection system 302 including the fraud detector 310 can be executing on the POS systems 304A-N and/or all or a portion of the fraud patterns data 312 and supplemental DB data 314 can be located on the POS systems 304A-N.

Although only one fraud detection system 302 is depicted in FIG. 3, it will be understood that there can be multiple fraud detection systems 302 which can interface with other networked components, such as POS systems 304A-N and one or more POS transaction systems 308 across the network 306 over a geographically wide area. The value of "N" refers to an arbitrary number and need not include the same number when referenced elsewhere throughout the application. The network 306 may be any type of communications network known in the art and can include a combination of wireless, wired, and/or fiber optic links.

In one or more exemplary embodiments, the fraud detection system 302 and the POS transaction system 308 are each implemented on a high-speed processing device (e.g., a mainframe computer system, a cloud computing system, or the like) including at least one processing circuit (e.g., a computer processor/CPU) capable of reading and executing instructions, and handling interactions with various components of the system 300. Alternatively, the fraud detection system 302 and/or the POS transaction system 308 can be embodied entirely in hardware including circuits and memory to perform processes as described herein.

In one or more exemplary embodiments, the POS systems 304 A-N can include a variety of computing devices with processing circuits and I/O interfaces, such as keys/buttons, a touchscreen, audio input, a display device and audio output. The POS systems 304A-N can be embodied in any type of computing device known in the art, such as a laptop, tablet computer, mobile device, personal computer, workstation, server, and the like. Accordingly, the POS systems 304A-N can include various computer/communication hardware and software technology known in the art, such as one or more processing units or circuits, volatile and non-volatile memory including removable media, power supplies, network interfaces, support circuitry, operating systems, and the like.

Figure 4:
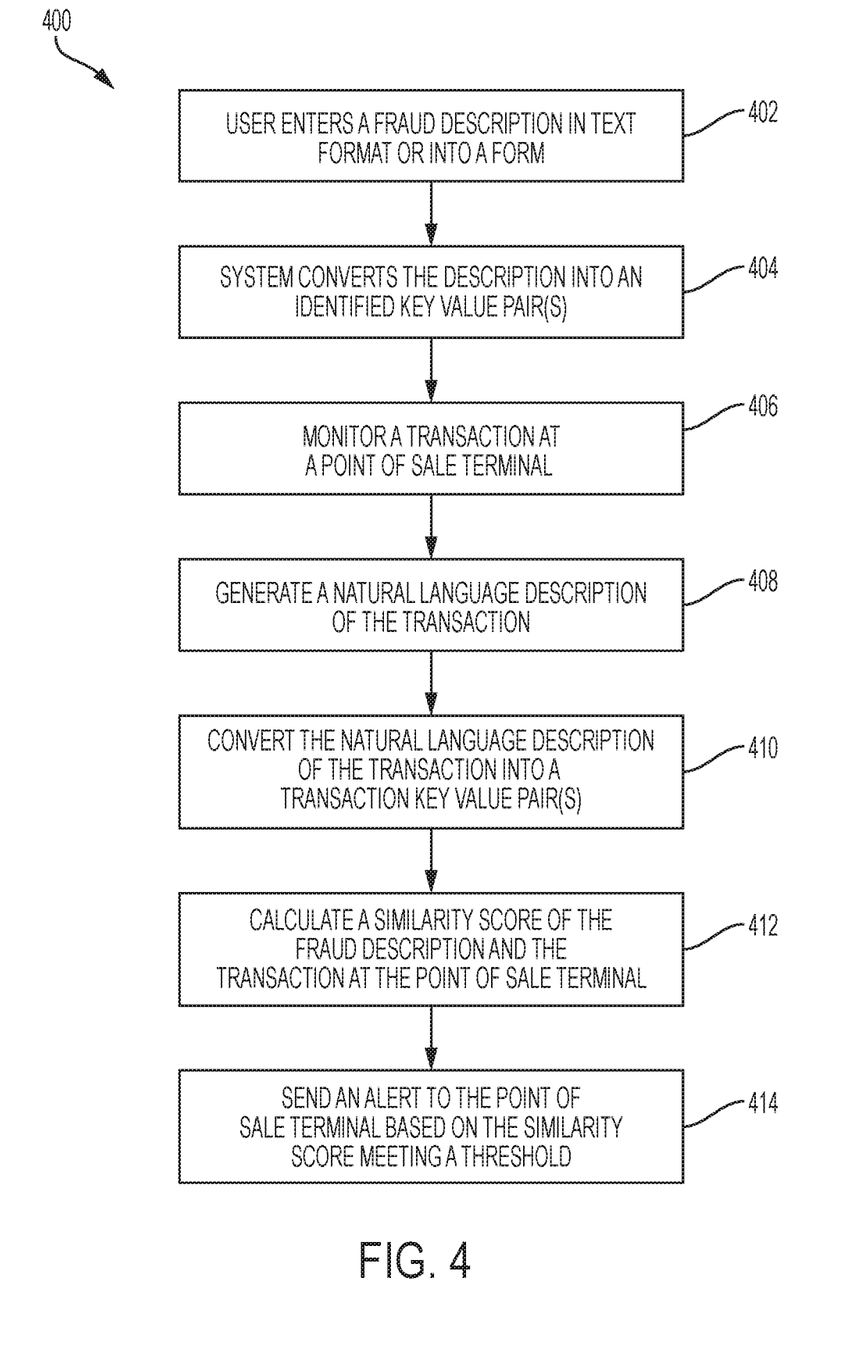
FIG. 4 depicts a flow diagram of real-time pattern matching of POS terminal transactions and unstructured text in accordance with one or more embodiments.

Turning now to FIG. 4, a flow diagram of a process for real-time pattern matching of POS terminal transactions and unstructured text to detect fraudulent activity in a retail environment is generally shown in accordance with one or more embodiments. Fraud detection is used as an example application of embodiments described herein. Embodiments are not limited to being used for fraud detection and can be applied to any application where unstructured text data is compared in real-time to DB contents. The processing shown in FIG. 4 can be performed using all or a portion of the components shown in the system 300 of FIG. 3.

At block 402, a description of a fraud is entered into the fraud detection system 302 by a user, via for example, the fraud detection interface 320A executing on a POS system 304A. In accordance with one or more embodiments, a facility such as the fraud detection interface 320A is provided to allow users who experience a fraud to enter information about the fraud into a fraud detection system 302. For example, a customer may attempt to return a blood glucose monitor for full price to a pharmacy. An employee, e.g., a pharmacist, at the pharmacy may realize that the customer had earlier received an in store promotional credit and that the customer had also received a rebate coupon. The pharmacist recognizes this as a fraudulent activity and reports the fraud by entering a description of the fraud either in text format or into a form. For example, the pharmacist may type into the system: "Customer returned product XYZ attempting to get full price back. The product was not purchased at full price. Product was purchased with an instant register coupon discount and a manufacturer rebate."

At block 404, the text data entered at block 402 is converted into a human readable, machine parse-able format. Using fraud detection as the example, the fraud detecting system 302 receives the fraud description (e.g., in unstructured text) and converts it into a human readable, machine parse-able format that is compiled in a fraud reference center, for example, and stored as fraud pattern data 312. In this example, the output from block 404 can include the following identified pattern key value pairs:

Pharmacy_Actor=Pharmacist
Fraud_Actor=Pharmacy Customer
Fraud_Action=Product Return
Product=XYZ Blood Glucose Monitor
Product_Type=Glucose Monitor
Initial_Interaction=Purchased product with instant register coupon discount and rebate
Fraud_Descriptor=Return for full price In accordance with one or more embodiments, the converting is performed using a standard parser combined with one or more industry specific dictionaries to facilitate named entity extraction. The tool extracts as many of the desired terms from the unstructured text as possible. If more than one match for a field is found it can use a weighted confidence algorithm to choose the best answer, or simply return all possible answers along with a rating metric.

At block 406, transactions being performed by the POS transaction system 308 are monitored, and at block 408 a natural language description of the transactions is generated.

In accordance with one or more embodiments, the fraud detection system 302 allows users to create human readable text aliases for column names and column data for tables in the POS DB 318. A graphical user interface (GUI) of the fraud detection interface 320 can be used to allow users to first view all tables in the POS DB 318 that they have access to via, for example, a Java database connection (JDBC). This view can capture data in the DBMS catalog tables. In addition, data about referential integrity (RI) constraints and triggers (e.g. row level triggers) is also gathered. Within this view, users can select any individual column and assign a name/phrase to that column within the tool. This human readable text can be stored in the catalog tables as a column label or column alias or it can be stored as supplemental DB data 314 within the fraud detection system 302 runtime environment. Similarly, for low cardinality columns where the values are not identifiable without a description (e.g. column RETURNCODE), one or more embodiments can present a list of distinct values within the column (via table query) and allow users to supply human readable descriptors for the unique values. When a user selects a table to add these descriptions, the fraud detection interface 320 can look at RI constraints and triggers to find associated tables. The associated tables are tables that are logically connected from a transaction perspective through primary/foreign key relationships and triggers.

Thus, in accordance with one or more embodiments, the tool provided by the fraud detection system 302 via the fraud detection interface 320 gives users the ability to view the tables/columns/values defined in a DBMS through catalog lookups. This provides users with the ability to assign human readable descriptions for columns, and to assign human readable descriptions to column values where values require explanation. In addition, in accordance with one or more embodiments, RI constraints and triggers can be take into account to pull in associated tables for definition. Output from assigning labels and descriptors can include:

```
CUSTOMER TABLE
    CUST_NAME COLUMN = CUSTOMER NAME
PRODUCT TABLE
SALES TABLE
    R IN "ACTION" COLUMN = RETURN
    P IN "ACTION" COLUMN = PURCHASED
```

In accordance with one or more embodiments, incoming transactions that are being monitored, such as updates to the customer table, product table and/or sales table are converted into a human readable, machine parse-able format. The fraud detection system 302 takes the added labels and descriptors, and converts information about the transactions into a human readable format. In accordance with one or more embodiments, the user turns the transactional text feature on for desired tables. In accordance with one or more embodiments, the information in the rows for each of these tables is "prepared" using the human readable column labels/aliases that the user has previously specified. In accordance with one or more embodiments, the user has the ability to refresh/cull these entries at a user specified interval. The refresh can remove the records in the fraud pattern data 312/supplemental DB data 314 and replace them with the refreshed data. Users can also specify which columns will participate in the text record creation. RDBMS transactional text creation for a row can be done using table triggers or using technologies commonly employed by replication technologies.

Continuing with the example, a new fraudulent return transaction of the blood glucose monitor by another customer at another store occurs. This transaction causes updates to records in multiple online transaction processing (OLTP) databases in the POS DB 318. The fields in those tables include for example:

```
OLTP TABLES = CUSTOMER, PRODUCT, SALES
CUSTOMER TABLE
    Customer number
PRODUCT TABLE
    Product ID
SALES TABLE
    Transaction
    Amount
```

In this example, each of the fields have descriptive labels:
Pharmacy Customer Number
Product Number
Transaction Data Description Lookup->Case if value='R' then 'Action=Returned'; Case if value='P' then 'Action=Purchased'
Amount Using these human readable descriptions, a transactional record can be described in a natural language format as:
Customer Number=123456
Action=Returned Product Number 789
Amount=$73.00

Referring back to FIG. 4, at block 410, the natural language description of the transaction is converted into a transaction key value pair(s). In accordance with one or more embodiments, the natural language output from block 408 is aggregated with other correlated data that has previously been converted and stored. The more description information that is available and used to described a transaction or fraud, the more accurate the similarity analysis. Records such as customer information or product information can be fairly static, so they are good candidates for being prepared and correlated to the fraud description information to make the aggregate record more descriptive.

Starting, for example, with transaction key value pairs corresponding to the example transaction information above:
Customer Number=123456
Action=Returned Product Number 789
Amount=$73.00

This may not match to the fraud description if the transaction contains the product number and the fraud description contains the product name but not the product number.
Pharmacy_Actor=Pharmacist
Fraud_Actor=Pharmacy Customer
Fraud_Action=Product Return
Product=XYZ Blood Glucose Monitor
Product_Type=glucose monitor
Initial_Interaction=Purchased product with instant register coupon discount and rebate
Fraud_Descriptor=Return for full price.

However, the fraud detection system 302 may have already described records about each individual customer record and each individual product record (e.g., each record in the product dimension and customer dimension). Product and customer are two examples where it can make sense to have a fully prepared human readable descriptor (and aggregate descriptors) for each record:
Customer
   Customer_Number=123456
   Customer_Name=Jane Doe
   Customer_Sex=female
   Customer_Address=1234 Any Street Hartford N.Y. 12345
Product
   Product Number=789
   Product=XYZ Blood Glucose Monitor
   Product_Type=blood glucose monitor Product has rebate product has instant register coupon discount full price $73.00

In accordance with one or more embodiments, the fraud detection system 302, automatically correlates a transaction with other relevant info it has "prepared" (e.g. product id, customer id) to create a single structure, and produces a more complete description of the fraud or transaction by merging records together. This can lead to better matching and a more accurate similarity score. In this example, this can result in the following transaction key value pairs:

Customer_Number=123456
Customer_Name=Jane Doe
Customer_Sex=female
Customer_Address=1234 Any Street Hartford N.Y. 12345
Action=Return
Amount=$73
Product Number=789
Product=XYZ Blood Glucose Monitor
Product_Type=blood glucose monitor
Product has rebate product has instant register coupon discount full price $73.00

At block 412, a similarity score of the fraud description in the identified key value pairs output from block 404 and the description of the transaction in the transaction key value pairs output from block 410 is calculated. Based on the similarity score meeting at threshold, an alert is generated at block 414. In one more embodiments, different alerts are generated based on the similarity score meeting different thresholds. For example, an alert that includes a suggestion for an employee at a POS system 204 to get more information from the customer may be generated when the similarity score meets a first threshold and an alert may end the transaction based on the similarity score meeting a second threshold. Any number of other thresholds and alerts can also be implemented by one or more embodiments.

In accordance with one or more embodiments, a stream based technology performs transactional matching of POS transactions described in the format above to references in the fraud reference center (e.g., fraud patterns data 312). Assuming a certain percentage match, the return may get flagged for further determination by the POS agent. Returning to the example, the values in italics in the following key value pairs match the fraud pattern:

Fraud Description
  Pharmacy_Actor=Pharmacist
  Fraud_Actor=Pharmacy Customer
  Fraud_Action=Product Return
  Product=XYZ Blood Glucose Monitor
  Product_Type=blood glucose monitor
  Initial_Interaction=Purchased product with instant register coupon discount and rebate
  Fraud_descriptor=Return for full price
Transaction Description
  Customer_Name=Jane Doe
  Customer_Sex=female
  Customer_Address=1234 Any Street Hartford N.Y. 12345
  Action=Return
  Amount=$73
  Product Number=789
  Product=XYZ Blood Glucose Monitor
  Product_Type=blood glucose monitor
Product has rebate
Product has instant register coupon discount full price $73.00
Match results
  85% match (hypothetical match %)
  Return for full price? (The system could ask the POS representative this question for additional information to increase match %. This question can be stored in the fraud pattern data 312. Alternatively, the system can determine the answer automatically by comparing the dollar amount of the return action to the full product price.)

In accordance with one or more embodiments, an advisor is available that can aggregate these suggestions and deliver reports to database administrators on most commonly missing data or ambiguous synonyms. In addition, the user can provide multiple labels for a given column. This can be useful in cases where is known that a user at POS device uses different terminology for a given event (e.g., bought vs purchased). Alternatively, or in addition, synonym matching can automatically recognize known synonyms, however for the most common synonyms having multiple labels can be used to improved performance by avoiding having to lookup synonyms.

Once these transactions are validated as fraudulent, a more detailed entry can be added to the fraud pattern data 312 with this particular fraud, including a list of products with coupons/rebates, and additionally the manufacturer can be alerted to require the original receipt to provide the rebate, thus eliminating the possibility for a return. Please note that the above would also work if the original fraud description was for a blood glucose monitor and if the customer tried to return a hair dryer with an instant register coupon discount and a rebate. The match percentage would be a lower, but it would still pose the question to the POS representative. Additionally, a look-up area can be maintained of product name and attributes that are derived from publicly mined information as well as internal information to broaden the correlation ability.

In accordance with one or more embodiments, additional technologies can be used to improve the matching (also referred to herein as calculating a similarity score), such as, but not limited to: synonym and aggregate replacement. For example:

Fraud pattern is pharmacy customers who make multiple refills of schedule II narcotics in less than two months
  Patient XYZ refills Percoset on Jan. 1, 2014
  Patient XYZ refills Percoset on Feb. 1, 2014

In accordance with one or more embodiments of the fraud detection system 302, the above fraud pattern can logically be replaced (or bolstered with synonym/aggregates) by the following for matching:

Patient XYZ multiple refills of Percoset schedule II narcotic from Jan. 1, 2014 to Feb. 1, 2014 in 31 days
Synonym data can be pulled from an existing resource, such as but not limited to: a WordNet® synset to determine that Percoset is a schedule II narcotic in order to detect the fraud pattern in Patient XYZ refills.

The logical expansion of the language can be performed by embodiments using either static rules mapping the most common phrases to a normalized form, or by using any existing paraphrase detection algorithm.

In accordance with more embodiments, the fraud detection system 302 can mine and classify internal or publicly available unstructured and structured fraud information and determine if it is relevant to a customer's environment. For example, assume that the following information is publicly available fraud information on the Internet or internally available:

"Thieves are stealing laundry pods from buckets of Company X laundry buckets. Recommended intervention is to secure these buckets or . . . "

In accordance with one or more embodiments, attributes of the fraud as described in the publicly available information are compared to the prepared human readable records in the product table. In this way, the fraud detection system 302 can determine which store contains the specific laundry pods based on the product id (and any other attributes provided) and issue an alert to the store manager with the intervention (e.g. to lock up the laundry pod buckets).

Figure 5:
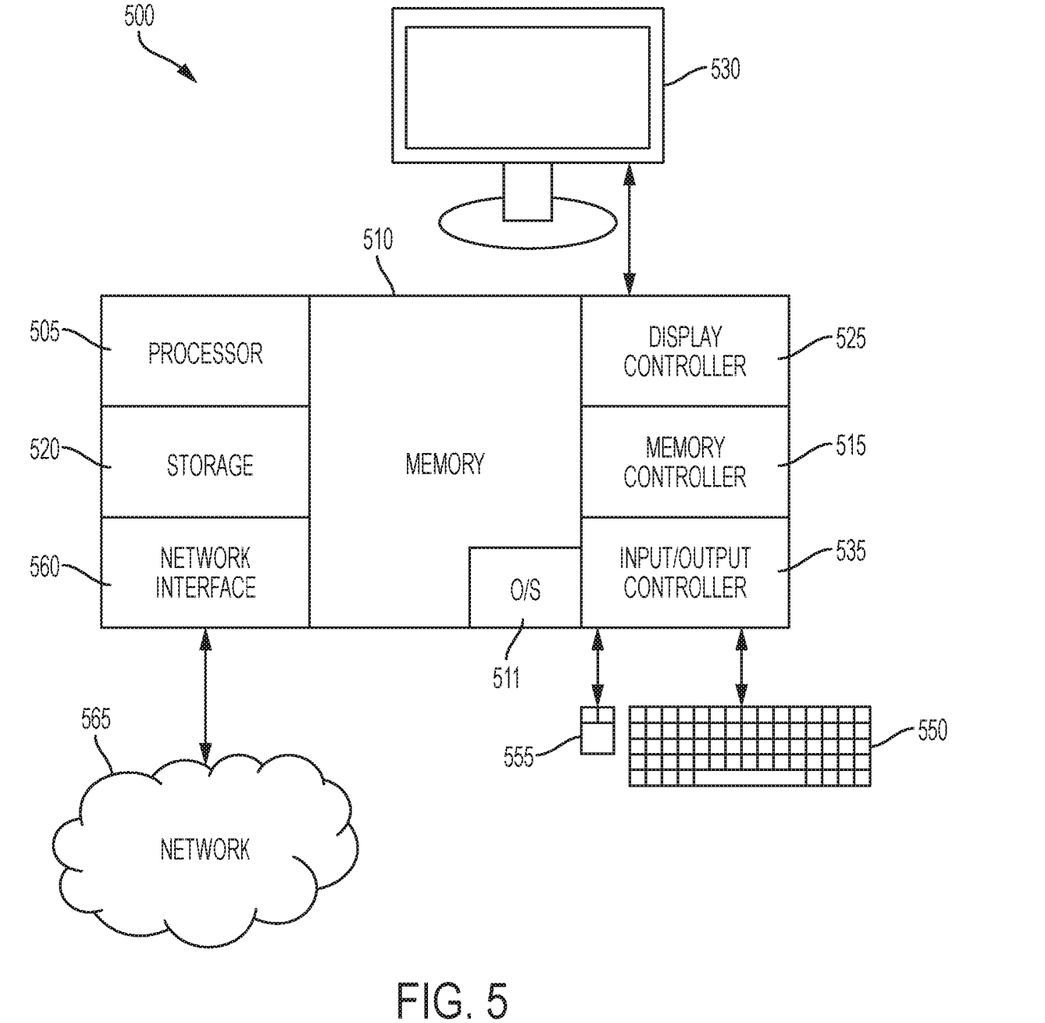
FIG. 5 depicts a block diagram of a computing device for implementing aspects of the system in accordance with one or more embodiments.

Turning now to FIG. 5, a block diagram of a computing device for implementing some or all aspects of the system 100 of FIG. 1 and system 300 of FIG. 3 is generally shown in accordance with an embodiment. FIG. 5 illustrates a block diagram of a computing device 500 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computing device 500, such as a cellular phone, a personal digital assistant (PDA), tablet computer, personal computer, workstation, minicomputer, or mainframe computer for example. For instance, embodiments of the computing device 500 can be used to implement one or more of the event detection system 102, user system 104, and/or DB transaction system 108 of FIG. 1. In one or more other embodiments, the computing device 500 can be used to implement one or more of the fraud detection system 302, POS systems 304A-N, and/or POS transaction system 308 of FIG. 3.

In some embodiments, as shown in FIG. 5, the computing device 500 includes a processor 505, memory 510 coupled to a memory controller 515, and one or more I/O devices 540, which are communicatively coupled via a local I/O controller 535. These I/O devices 540 may include, for example, a microphone 570, a camera 575, one or more speaker 580, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computing device 500, a semiconductor based microprocessor (in the form of a microchip or chip set), a macroprocessor, or other device for executing instructions.

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services. The instructions in the memory 510 also include instructions for implementing embodiments of the event detector 110, event detection interface 120, and DB application 116 of FIG. 1. In one or more other embodiments, the instructions in the memory 510 also include instructions for implementing embodiments of the fraud detector 310, fraud detection interfaces 320A-N, and POS application 316 of FIG. 3.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the systems and methods of this disclosure.

The computing device 500 may further include a display controller 525 coupled to a display 530. In some embodiments, the computing device 500 may further include a network interface 560 for coupling to a network 565, such as network 106 of FIG. 1 and/or network 306 of FIG. 3. The network 565 may be an IP-based network for communication between the computing device 500 and an external server, client and the like via a broadband connection. The network 565 transmits and receives data between the computing device 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computing device 500, such as that illustrated in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
a memory having computer readable instructions; and
a processor for executing the computer readable instructions, the computer readable instructions including:

obtaining a pattern that describes an event that includes fraudulent activity in a natural language format;

converting the pattern that describes the event into at least one identified pattern key value pair;

monitoring a database transaction that updates a record in an online transaction processing database;

converting the database transaction into at least one database transaction key value pair that describes the database transaction;

logging information associated with the pattern that describes the event and the database transaction;

aggregating the information with previously logged information, the aggregating including using synonyms and aggregate terms;

calculating a similarity score based at least in part on the aggregated information, the calculating including scoring similarities between the at least one identified pattern key value pair and the at least one database transaction key value pair; and based on the similarity score meeting a threshold, outputting an alert to indicate that the database transaction matches the pattern that describes the event.

2. The system of claim 1, wherein the converting the pattern that describes the event into at least one identified key value pair includes using natural language processing.

3. The system of claim 1, wherein the converting the database transaction into at least one database transaction key value pair is based at least in part on supplemental database data that includes user supplied column labels and data descriptors.

4. The system of claim 1, wherein the computer readable instructions further include performing at least one action selected from the group consisting of: ending the database transaction, notifying an administrator, and logging information about the alert.

5. The system of claim 1, wherein the database transaction is point of sale (POS) transaction.

6. The system of claim 1, wherein the computer readable instructions further include stopping the database transaction based on the similarity score meeting the threshold.

7. The system of claim 1, wherein the pattern describes a fraudulent activity.

8. The system of claim 1, wherein the computer readable instructions further include stopping the database transaction based on the similarity score meeting the threshold.

9. A computer program product comprising a non-transitory computer readable storage medium having program instructions embodied therewith, the program instructions executable by a processor to cause the computer processor to perform:

obtaining a pattern that describes an event that includes fraudulent activity in a natural language format;

converting the pattern into at least one identified pattern key value pair;

monitoring a database transaction that updates a record in an online transaction processing database;

converting the database transaction into at least one database transaction key value pair that describes the database transaction;

logging information associated with the pattern that describes the event and the database transaction;

aggregating the information with previously logged information, the aggregating including using synonyms and aggregate terms;

generating a similarity score based at least in part on the aggregated information, the generating including scoring similarities between the at least one identified pattern key value pair and the at least one database transaction key value pair; and based on the similarity score meeting a threshold, outputting an alert to indicate that the database transaction matches the pattern that describes the event.

10. The computer program product of claim 9, wherein the converting the pattern that describes the event into at least one identified key value pair includes using natural language processing.

11. The computer program product of claim 9, wherein the converting the database transaction into at least one database transaction key value pair is based at least in part on supplemental database data that includes user supplied column labels and data descriptors.

12. The computer program product of claim 9, wherein the database transaction is point of sale (POS) transaction.

13. The computer program product of claim 9, wherein the computer processor further performs stopping the database transaction based on the similarity score meeting the threshold.

* * * * *